US008681271B2

(12) United States Patent
Iwaki et al.

(10) Patent No.: US 8,681,271 B2
(45) Date of Patent: Mar. 25, 2014

(54) SYNCHRONIZATION SIGNAL ADJUSTMENT DEVICE, SYNCHRONIZATION SIGNAL ADJUSTMENT METHOD, IMAGE DISPLAY DEVICE, AND SYNCHRONIZATION SIGNAL GENERATION DEVICE

(71) Applicant: Sony Computer Entertainment Inc., Tokyo (JP)

(72) Inventors: Hideaki Iwaki, Tokyo (JP); Masayoshi Mizuno, Tokyo (JP); Youji Kita, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/834,687

(22) Filed: Mar. 15, 2013

(65) Prior Publication Data

US 2013/0271656 A1    Oct. 17, 2013

(30) Foreign Application Priority Data

Apr. 16, 2012    (JP) .................................. 2012-093333

(51) Int. Cl.
*H04N 7/00*    (2011.01)
(52) U.S. Cl.
USPC ........................................................ 348/500
(58) Field of Classification Search
USPC ......... 348/500, 516–517, 521, 515, 725, 553; 386/201, 207–208; 327/141, 144
See application file for complete search history.

(56) References Cited

U.S. PATENT DOCUMENTS

| | | | | |
|---|---|---|---|---|
| 5,719,619 A * | 2/1998 | Hattori et al. | ................... | 725/24 |
| 5,990,940 A * | 11/1999 | Hashimoto et al. | ........... | 348/184 |
| 6,453,109 B1 * | 9/2002 | Yamamoto | ..................... | 386/207 |
| 6,549,046 B1 * | 4/2003 | Klecka, III | ..................... | 327/153 |
| 6,563,888 B1 * | 5/2003 | Toriyama | ..................... | 375/340 |
| 7,649,568 B2 * | 1/2010 | Huang et al. | .................. | 348/465 |
| 7,818,779 B2 * | 10/2010 | Matsuzaki et al. | ............ | 725/143 |
| 7,865,064 B2 * | 1/2011 | Tsuruga | ........................ | 386/264 |
| 8,073,000 B2 * | 12/2011 | Sarashina | ..................... | 370/441 |
| 8,213,545 B2 * | 7/2012 | Eng et al. | ..................... | 375/320 |
| 2007/0008428 A1 * | 1/2007 | Hong | ............................ | 348/500 |
| 2011/0123170 A1 * | 5/2011 | Kure | ............................. | 386/241 |

* cited by examiner

*Primary Examiner* — Paulos M Natnael
(74) *Attorney, Agent, or Firm* — Katten Muchin Rosenman LLP (57) ABSTRACT

A receiver receives a stream of program data that includes: an image signal including a plurality of frames; a sound signal; and a playback timing signal used for synchronized playback of the image signal and the sound signal. A clock signal generation unit generates a clock signal that is independent of the playback timing signal. A reception timing signal acquisition unit acquires a reception timing signal indicating a receiving time of the program data. An analysis unit analyzes a trend of time-dependent variation in a detected difference between the reception timing signal and the playback timing signal. An adjustment amount generation unit generates an adjustment amount of the clock signal, which causes the difference between the reception timing signal and the playback timing to be constant, by referring to a trend of time-dependent variation analyzed by the analysis unit.

8 Claims, 11 Drawing Sheets

SYNCHRONIZATION SIGNAL ADJUSTMENT DEVICE, SYNCHRONIZATION SIGNAL ADJUSTMENT METHOD, IMAGE DISPLAY DEVICE, AND SYNCHRONIZATION SIGNAL GENERATION DEVICE

BACKGROUND OF THE INVENTION

1. Field of the Invention

The present invention relates to a technology of adjusting and generating synchronization signals.

2. Description of the Related Art

Recently, it has become common for households to build a storage system in which a network attached storage (NAS) is connected to a computer network. An NAS is a file server provided with a hard disk drive and is configured to provide a content file to a client device via a TCP/IP network.

Some NASs are provided with a tuner compatible with terrestrial digital broadcast and satellite digital broadcast. Users can view a live program or view a recorded program at a client device via the TCP/IP network. In this process, program data are converted into a data format such as Moving Picture Experts Group (MPEG) 2 Transport Stream (TS) and delivered accordingly.

To view a live program delivered in a live stream primarily using an NAS via a TCP/IP network, a certain amount of data is buffered before the data is transmitted or played back, for the purpose of canceling variation in the bit rate of the streaming data. When the data is temporarily buffered in an NAS, etc. before being transmitted to a client device, the timing of arrival at the client device is shifted from the timing of transmission at a broadcast station. Therefore, the timing of synchronizing an image and sound transmitted by a broadcast station need be reproduced in order to view a live program delivered in a stream via a TCP/IP network.

Normally, an oscillator for generating a timing signal in a broadcast station and an oscillator used for synchronization in a client device are different and are considered to contain a slight error. The error will be normegligible if the program is viewed for a long period of time. A technology is called for capable of correcting the error.

SUMMARY OF THE INVENTION

The present invention addresses the aforementioned challenge and a purpose thereof is to provide a technology of improving synchronized playback of data delivered in a live stream.

A synchronization signal adjustment device according to one embodiment of the present invention includes: a receiver configured to receive program data that includes: an image signal including a plurality of frames; a sound signal; and a playback timing signal used for synchronized playback of the image signal and the sound signal, wherein each signal is delivered in a stream via a network; a clock signal generation unit configured to generate a clock signal that is independent of the playback timing signal included in the program data received by the receiver; a reception timing signal acquisition unit configured to acquire a reception timing signal indicating a receiving time of the program data by the receiver, by referring to the clock signal generated by the clock signal generation unit; an analysis unit configured to analyze a trend of time-dependent variation in a detected difference between the reception timing signal acquired by the reception timing acquisition unit and the playback timing signal included in the program data received by the receiver; and an adjustment amount generation unit configured to generate an adjustment amount of the clock signal, which is generated by the clock signal generation unit and which causes the difference between the reception timing signal and the playback timing to be constant, by referring to the trend of time-dependent variation analyzed by the analysis unit.

Another embodiment of the present invention relates to a synchronization signal playback method. The method is implemented by a processor and includes: receiving program data that includes: an image signal including a plurality of frames; a sound signal; and a playback timing signal used for synchronized playback of the image signal and the sound signal, wherein each signal is delivered in a stream via a network; generating a clock signal that is independent of the playback timing signal included in the received program data; acquiring a reception timing signal indicating a receiving time of the program data by referring to the generated clock signal; analyzing a trend of time-dependent variation in a detected difference between the acquired reception timing signal and the playback timing signal included in the received program data; and generating an adjustment amount of the clock signal unit, which causes the difference between the reception timing signal and the playback timing to be constant, by referring to the trend of variation.

Another embodiment of the present invention relates to an image display device. The device includes: the aforementioned synchronization signal adjustment device; an isolation unit configured to isolate the image signal, the sound signal, and the playback timing signal from the program data received by the synchronization signal adjustment device; a vertical synchronization signal generation unit configured to generate a vertical synchronization signal used to output an image; a synchronization unit configured to synchronize the image signal and the sound signal isolated by the isolation unit, by referring to the playback timing signal isolated by the isolation unit, the vertical synchronization signal generated by the vertical synchronization signal generation unit, and the adjustment amount generated by the synchronization signal adjustment device; and an output unit configured to play back the image signal and the sound signal synchronized by the synchronization unit, by referring to the vertical synchronization signal generated by the vertical synchronization signal generation unit.

Another embodiment of the present invention relates to a synchronization signal generation device. The device includes: the aforementioned synchronization signal adjustment device; a voltage-controlled crystal oscillator configured to generate a clock signal of a variable frequency; and a vertical synchronization signal generation unit configured to generate a vertical synchronization signal used to output an image, by referring to a clock signal generated by the voltage-controlled crystal oscillator. The voltage-controlled crystal oscillator adjusts the frequency of the generated clock signal, by referring to the adjustment amount of the clock signal generated by the synchronization signal adjustment device.

Another embodiment of the present invention relates to a program for implementing the steps of the aforementioned synchronization signal playback method using a computer.

The program may be provided as part of firmware built in a device to exercise basic control of hardware resources such as video and audio encoders. For example, the firmware is stored in a semiconductor memory such as a read only memory (ROM) or a flash memory. A computer-readable recording medium storing the program may be provided to provide the firmware or to update a part of the firmware. Alternatively, the program may be transmitted over a communication line.

Optional combinations of the aforementioned constituting elements, and implementations of the invention in the form of methods, apparatuses, systems, computer programs, data structures, and recording mediums may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
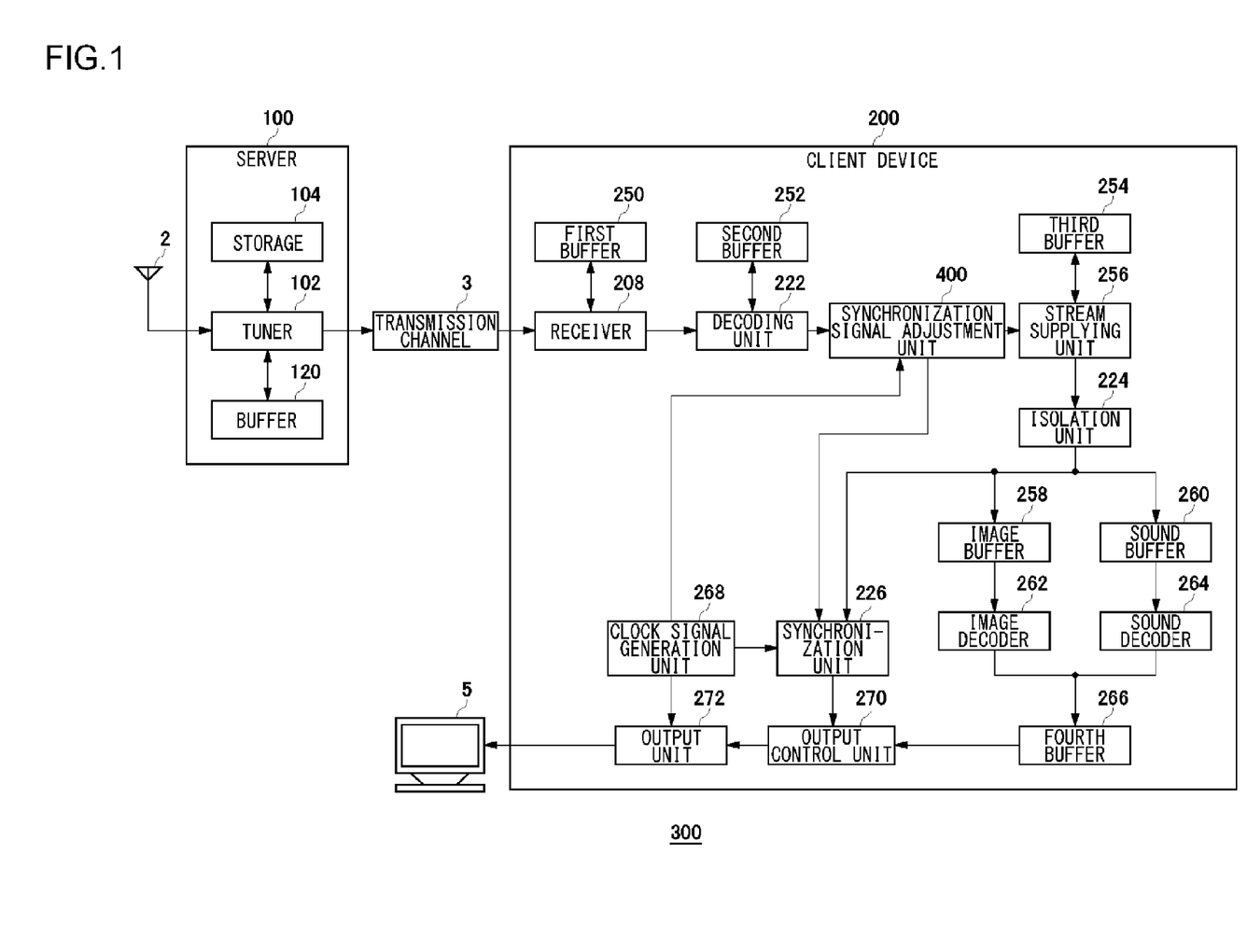
FIG. 1 schematically shows the overall structure of a data delivery system according to an embodiment of the present invention.

FIG. 1 schematically shows the overall structure of a data delivery system 300 according to an embodiment of the present invention. The data delivery system according to the embodiment includes an antenna 2, a server 100, a client device 200, a transmission channel 3, and a display unit 5.

The antenna 2 receives digital broadcast such as terrestrial digital broadcast or satellite digital broadcast. The server 100 is provided with a three-band tuner 102 compatible with terrestrial digital broadcast, BS digital broadcast, and CD digital broadcast, and a buffer 120 for delivery. The server delivers a program live to the client device 200 via the transmission channel 3 implemented by, for example, a local area network (LAN). The server 100 is also provided with a storage 104 so as to function as a NAS capable of providing a recorded program to the client device 200. In this specification, immediate live delivery of digital broadcast received by the antenna 2 to the client device or recording of digital broadcast received by the antenna 2 will be inclusively referred to as "live reception".

The server 100 and the client device 200 are compatible with digital living network alliance (DLNA). The server 100 divides program data into packets in units of a predetermined size and encrypts the packets by DTCP-IP before delivering the data. The "predetermined size" is a size that defines a unit of transmission in MPEG2TS. More specifically, the predetermined size is equal to 192 bytes produced by appending a 4-byte arrival time stamp (ATS) to a 188-byte TS packet.

"ATS" is a signal included in data received by the tuner 102 from a broadcast station and synchronized with a program clock reference (PCR) appended in the broadcast station. "PCR" is a signal referred to when an image and sound of a program are played back in sync. ATS is a signal appended when the data arrives at the tuner 102. Normally, the tuner 102 receives data in the order of transmission from the broadcast station so that PCR and ATS are synchronized. Therefore, ATS is a signal that can be used for synchronized playback. Thus, ATS may be referred to as "playback timing signal" as necessary in the specification.

A summary will be given of how the client device 200 receives program data from the server 100 and plays back an image.

A receiver 208 receives a stream of program data via the transmission channel 3. The program data includes an image signal including a plurality of frames, a sound signal, and a playback timing signal used for synchronized playback of the image signal and the sound signal. As mentioned above, the program data is encrypted in DTCP-IP. Upon receipt of program data from the server 100, the receiver 208 stores the data in a first buffer 250 until a unit of decoding of a predetermined size is stored. The decoding unit 222 decodes the program data stored in the first buffer in units of decoding of a predetermined size and stores the data in a second buffer 252.

A synchronization signal adjustment unit 400 analyzes MPEG2TS packets decoded by the decoding unit 222 before outputting the packets to a stream supplying unit 256. The stream supplying unit 256 stores the packets acquired from the synchronization signal adjustment unit 400 in a third buffer 254. When the packets stored in the third buffer 254 is of a predetermined size or larger, the stream supplying unit 256 outputs the packets to an isolation unit 224.

The isolation unit 224 isolates an image signal, a sound signal, and a playback timing signal from the packets of program data acquired from the stream supplying unit 256. The isolation unit 224 stores the image signal and the sound signal isolated from the packets of program data in an image buffer 258 and a sound buffer 260, respectively. An image decoder 262 decodes the image signal stored in the image buffer 258 and stores the decoded signal in a fourth buffer 266. Similarly, the sound decoder 264 decodes the sound data stored in the sound buffer 260 and stores the decoded signal in the fourth buffer 266. For convenience of description, the isolation unit 224 is described as isolating an image signal, a sound signal, and a playback timing signal, and the image decoder 262 and the sound decoder 264 are described as storing an image signal and a sound signal in the fourth buffer 266. However, a skilled person would appreciate, that, if the program data includes a signal other than an image signal and a sound signal (e.g., caption data), the isolation unit is capable of processing (i.e. isolating decoding, and storing) such a signal. The image signal and the sound signal as decoded may be stored in different buffers.

A synchronization unit 226 synchronizes the image signal and the sound signal isolated by the isolation unit 224 in accordance with the playback timing signal. An output control unit 270 is controlled by the synchronization unit 226 to acquire, from the fourth buffer 266, the image signal and the sound signal subject to synchronization. An output unit 272 plays back the image signal and the sound signal acquired from the output control unit 270 in accordance with a clock generated by a clock signal generation unit 268. In this sense, the clock signal generation unit 268 functions as a vertical synchronization signal generation unit for generating a vertical synchronization signal used to output an image. The output unit 72 outputs an image according to the vertical synchronization signal and plays back the sound signal in synchronization with the image. The image played back by the output unit 272 is displayed in the display unit 5. The display unit 5 is provided with a built-in or separate speaker (not shown) and is capable of playing back sound.

The synchronization unit 226 synchronizes the image and sound according to ATS synchronized with PCR configured by the broadcast station. In this process, the synchronization unit 226 times the synchronization according to the clock signal generation unit 268. Meanwhile, PCR is appended in the broadcast station according to a clock signal generated by a different clock signal generation device (not shown) located inside the broadcast station. Therefore, the clock signal referred to when PCR is appended and the clock signal referred to time synchronized playback do not depend on each other. Therefore, an error is created even if the clock signals are configured to time playback identically.

Figure 2A:
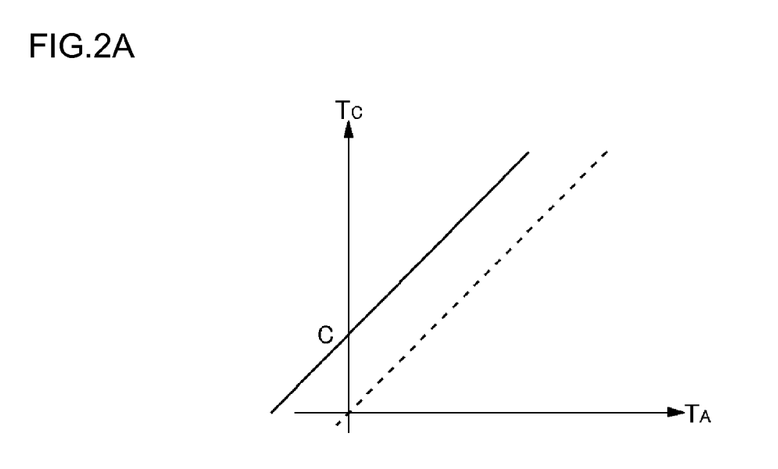
FIGS. 2A-2C are charts showing the relationship between the timing of ATS and the clock signal generated by the clock signal generation unit.
Figure 2B:
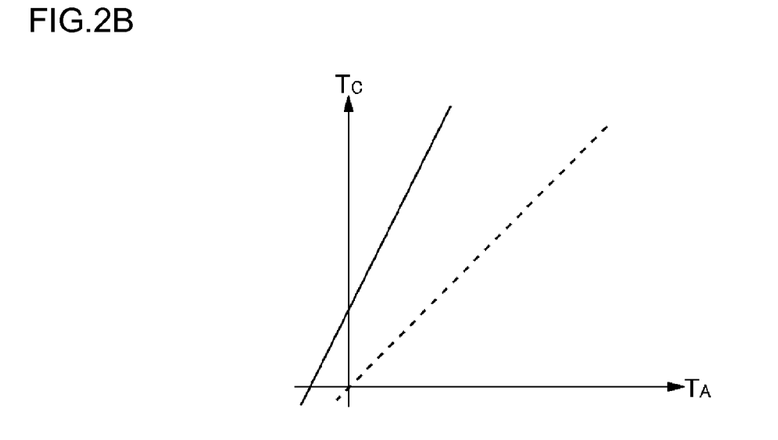
Figure 2C:
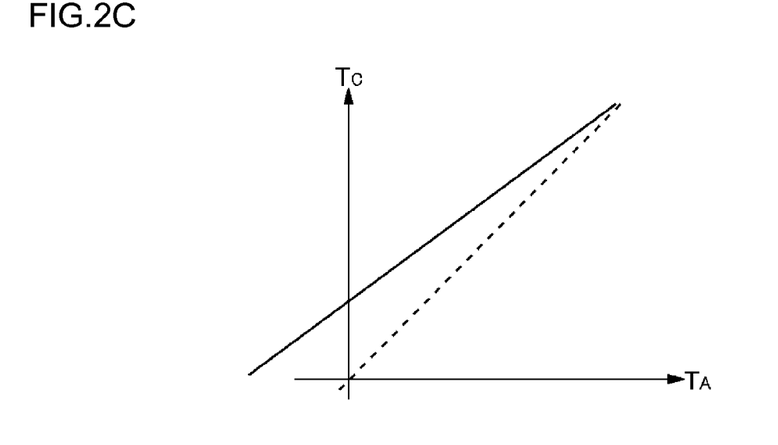

FIGS. 2A-2C are charts showing the relationship between the timing of ATS and the clock signal generated by the clock signal generation unit 268. In FIGS. 2A-2C, the horizontal axis represents the timing of ATS and the vertical axis represents the clock signal TC generated by the clock signal generation unit 268.

FIG. 2A shows the relationship occurring when there is no error between the clock signal generated by the signal generation device in the broadcast station and the clock signal generated by the clock signal generation unit 268. For example, if the clock signal generated by the signal generation device in the broadcast station and the clock signal generated by the clock signal generation unit 268 are identical, TC=TA so that the TC is plotted as indicated by the broken line in FIG. 2A in relation to TA. Generally, an offset C is created between TA and TC so that the relationship between TA and TC is as indicated by the straight line shown in FIG. 2A and is given by the following expression (1).

$$TC=TA+C \qquad (1)$$

In either case, the difference between TA and TC is constant.

FIG. 2B shows the relationship occurring when the gain of the clock signal generated by the clock signal generation unit 268 is larger than that of the clock signal generated by the signal generation device in the broadcast station. More specifically, it will be assumed that the gain of TC is a (a>1) times the gain of TA. In this case, the relationship between TA and TC is given by the expression (2) below, assuming an offset C as indicated by the straight line of FIG. 2A.

$$TC=aTA+C \qquad (2)$$

where a>1.

In this case, the difference between TA and TC is monotonously increased.

FIG. 2C shows the relationship occurring when the gain of the clock signal generated by the clock signal generation unit 268 is smaller than that of clock signal generated by the signal generation device in the broadcast station. More specifically, it will be assumed that the gain of TC is a (a<1) times the gain of TA. In this case, the relationship between TA and TC is given by the expression (3) below, assuming an offset C as indicated by the straight line of FIG. 2A.

$$TC=aTA+C \qquad (3)$$

where a<1.

In this case, the difference between TA and TC is monotonously decreased.

Figure 3A:
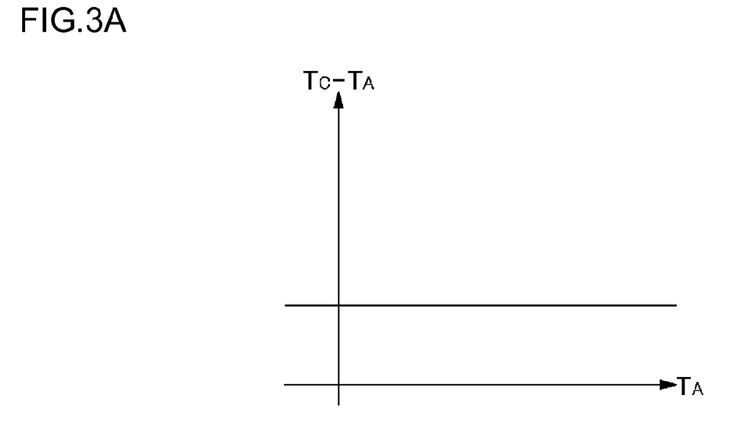
FIGS. 3A-3C are also charts showing the relationship between the timing of ATS and the clock signal generated by the clock signal generation unit.
Figure 3B:
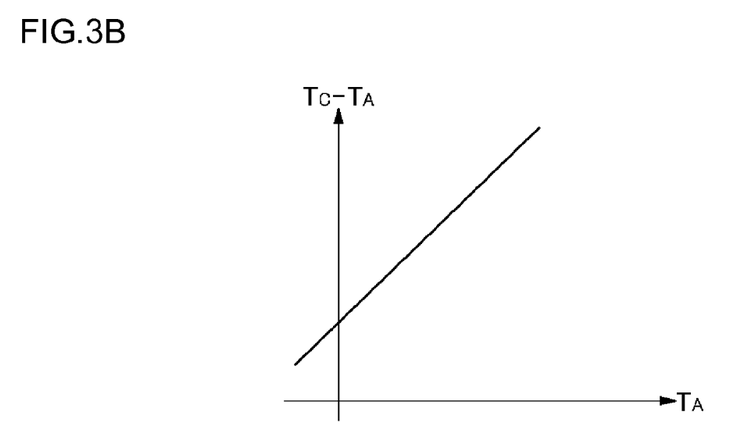
Figure 3C:
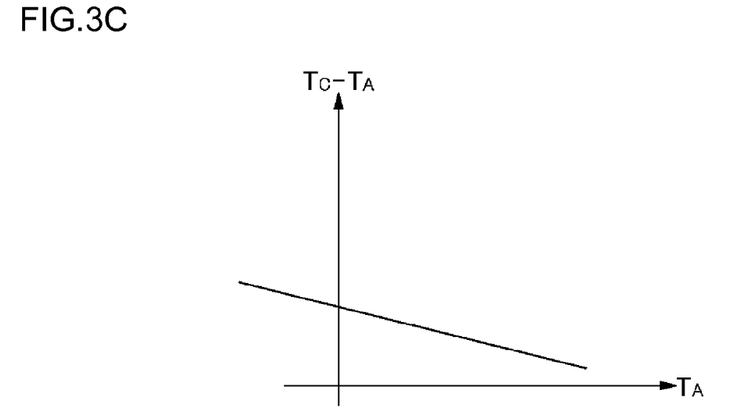

FIGS. 3A-3C are also charts showing the relationship between the timing of ATS and the clock signal generated by the clock signal generation unit 268. In FIGS. 3A-3C, the horizontal axis represents the timing of ATS and the vertical axis represents the difference TC−TA between the clock signal TC generated by the clock signal generation unit 268 and TA.

FIG. 3A shows the relationship occurring when there is no error between the clock signal generated by the signal generation device in the broadcast station and the clock signal generated by the clock signal generation unit 268. Modifying the expression (1) and denoting TC−TA using TA, we obtain the following expression (1)'.

$$TC-TA=C \qquad (1')$$

In other words, the difference between TC and TA is constant irrespective of TA.

FIG. 3B shows the relationship occurring when the gain of the clock signal generated by the clock signal generation unit 268 is larger than that of the clock signal generated by the signal generation device in the broadcast station. Modifying the expression (2) and denoting TC−TA using TA, we obtain the following expression (2)'.

$$TC-TA=(a-1)TA+C \qquad (2')$$

Since a−1>0, the straight line shown in FIG. 3B shows a steady increase. In other words, the larger TA, i.e. the longer the period of time elapsed since the start of playback, the more advanced TC becomes with respect TA. As a result, TA, which is referred to in order to display a frame in the received program data, will indicate a time more in the past than a time indicated by TC. Therefore, frames continue to be discarded.

FIG. 3C shows the relationship occurring when the gain of the clock signal generated by the clock signal generation unit 268 is smaller than that of the clock signal generated by the signal generation device in the broadcast station. Modifying the expression (3) and denoting TC−TA using TA, we obtain the following expression (3)'.

$$TC-TA=(a-1)TA+C=-(1-a)TA+C \qquad (3')$$

Since a−1<0, the straight line shown in FIG. 3C shows a steady decrease. In other words, the larger TA, i.e. the longer the period of time elapsed since the start of playback, the more delayed TC becomes with respect TA. As a result, TA, which is referred to in order to display a frame in the received program data, will indicate a time more in the future than a time indicated by TC. Therefore, frames continue to be stored in a buffer for playback.

As discussed, an error between the clock signal referred to when the signal generation device appends a timing signal and the timing signal referred to for synchronized playback creates a temporal gap between the signals and produces an error in synchronized playback. Therefore, there is a need to adjust these timing signals.

It is useful to determine the slope of the graph shown in FIGS. 3A-3C as a clue to know whether there is an error between the clock signal referred to when the signal generation device appends a timing signal and the timing signal referred to for synchronized playback, and, if there is an error, what trend is observed in the temporal gap between the signals.

A predetermined amount of data is stored in the buffer 120 before the stored data are delivered to the client device 200. When the program data is received by the receiver 208 in the client device 200, TC is defined by the clock generated by the clock signal generation unit 268. TC is related to TA but is not necessarily synchronized with TA. Normally, TC contains a large jitter.

The data processed by the receiver 208 and the decoding unit 222 are stored in the first buffer 250 and the second buffer 252, respectively, before being delivered to subsequent processing units. This introduces additional jitter, creating a larger shift between the timing of arrival of data in the subsequent processing units and TA. Further, if the function of the synchronization signal adjustment unit 400 is implemented by a software program executed by a computer, the time elapsed before the program is executed will introduce additional jitter.

Figure 4A:
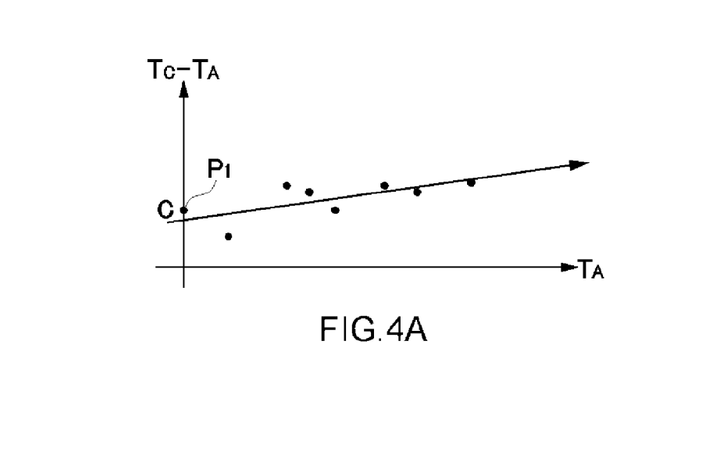
FIGS. 4A-4D show an exemplary method of analyzing the trend of the gap between the clock signals.

FIGS. 4A-4D show an example of analysis of the trend of the gap between the clock signals. FIG. 4A shows the trend of the gap between the clock signals occurring when the gain of the clock signal generated by the clock signal generation unit 268 is larger than that of the clock signal generated by the signal generation device in the broadcast station and when a jitter is small. Referring to FIG. 4A, the solid line indicates the trend of the difference (gap), i.e. time-dependent variation in the difference, occurring when there is no jitter. Values of TC-TC are plotted against values of TA.

FIG. 4A shows that the difference shows a trend of increase with time relative to the difference C indicated by the initial plot P1 since the gain of the clock signal generated by the clock signal generation unit 268 is larger than that of the clock signal generated by the signal generation device in the broadcast station. FIG. 4A also shows that the difference is decreased at a certain point of time relative to the difference C indicated by the initial plot P1 due to the jitter introduced during the transmission.

Figure 4B:
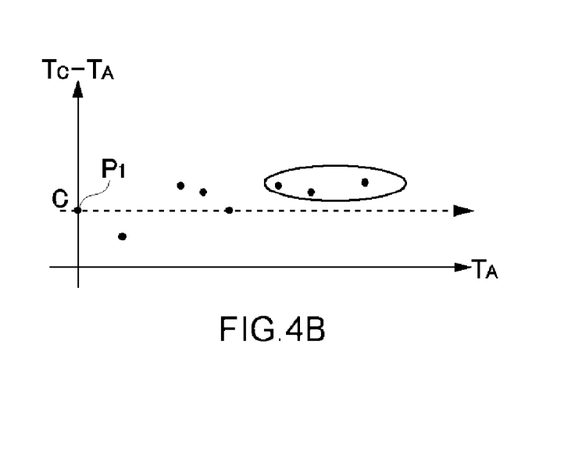

FIG. 4B shows an example of analysis of the trend of variation in the difference. As shown in FIG. 4B, if the variation in the difference occurs a predetermined number of times (three times, in the example shown in FIG. 4B) on the same side of the graph of the difference C indicated by the initial plot P1, it is determined the direction defined by the variation represents the trend of time-dependent variation in the difference. Subsequently, the clock signal TC generated by the clock signal generation unit 268 is controlled to cancel the offset. In this way, the gap between the clock signals can be adjusted. Referring to FIG. 4B, the plots encircled by the ellipse represent a group of plots occurring three times in a row on the same side of the graph of the difference C indicated by the initial plot P1.

Figure 4C:
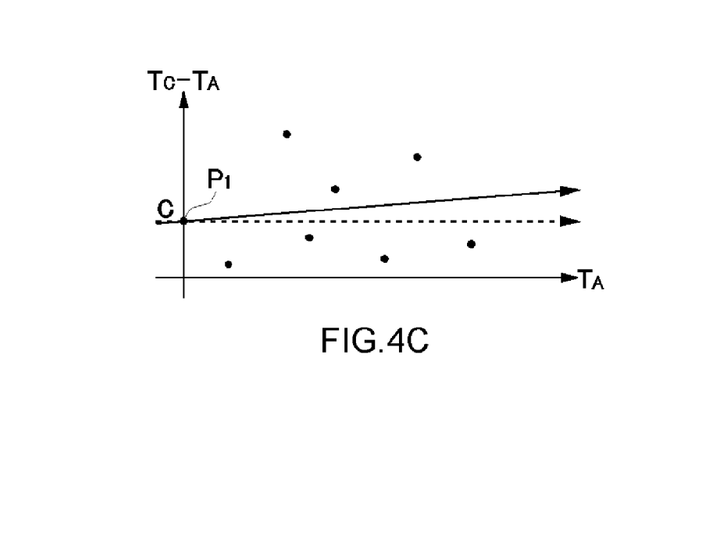

FIG. 4C shows the trend of the gap between the clock signals occurring when the gain of the clock signal generated by the clock signal generation unit 268 is larger than that of the clock signal generated by the signal generation device in the broadcast station and when the jitter is larger than that of the example shown in FIG. 4A. If a jitter is not introduced, the difference should be increased with time from the difference C indicated by the initial plot P1. Since the jitter is larger, however, it is difficult to identify the trend of the gap from the plots.

Figure 4D:
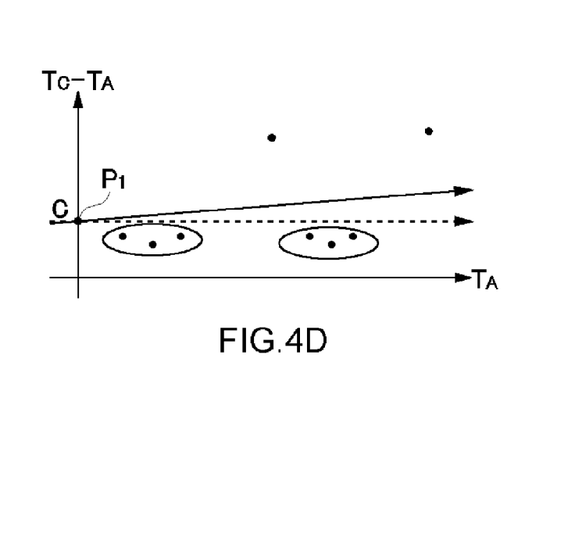

FIG. 4D also shows the trend of the gap between the clock signals occurring when the gain of the clock signal generated by the clock signal generation unit 268 is larger than that of the clock signal generated by the signal generation device in the broadcast station and when the jitter is larger than that of the example shown in FIG. 4A. FIG. 4D shows an exemplary case where a large buffer is located in the transmission channel 3 and a large jitter is introduced. As in the case of FIG. 4B, the plots of FIG. 4D encircled by the ellipse represent a group of plots occurring three times in a row on the same side of the graph of the difference C indicated by the initial plot P1. Due to the large jitter, however, the variation occurs on the side lower than the graph of the difference C indicated by the initial plot P1, demonstrating that a detection failure occurs. By controlling the clock signal TC generated by the clock signal generation unit 268 in the presence of a detection failure, the gap between the clock signals will be disadvantageously increased rather than decreased. A description will now be given of how the synchronization signals are adjusted according to the embodiment.

Figure 5:
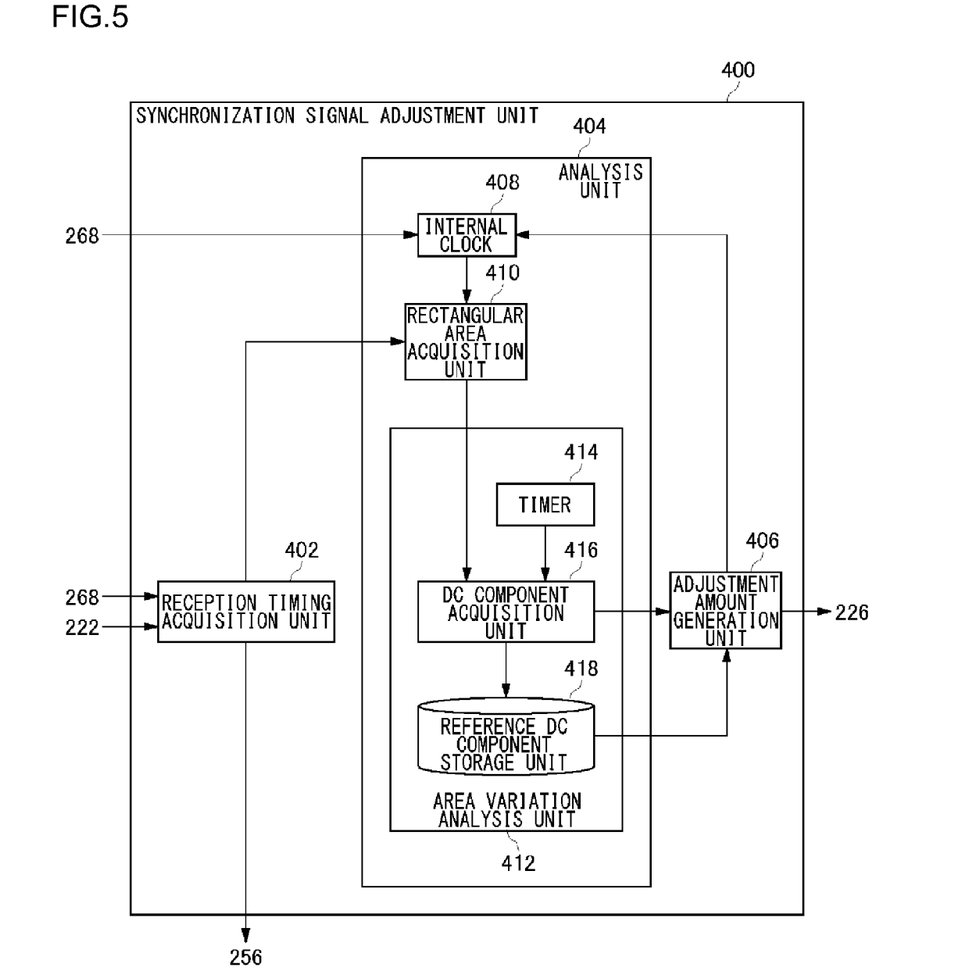
FIG. 5 schematically shows the internal configuration of the synchronization signal adjustment unit in the client device according to the embodiment.

FIG. 5 schematically shows the internal configuration of the synchronization signal adjustment unit 400 in the client device 200 according to the embodiment. The synchronization signal adjustment unit 400 includes a reception timing acquisition unit 402, an analysis unit 404, and an adjustment amount generation unit 406.

The reception timing acquisition unit 402 acquires a reception timing signal indicating the timing of receiving the program data received by the receiver 208 and decoded by the decoding unit 222, by referring to the clock signal generated by the clock signal generation unit 268. More specifically, the reception timing acquisition unit 402 acquires ATS included in the header of an MPEG2TS packet decoded by the decoding unit 222. After acquiring ATS, the reception timing acquisition unit 402 outputs, to the stream supplying unit 256, a plurality of MPEGTS2 packets transferred from the decoding unit 222.

The analysis unit 404 analyzes the trend of time-dependent variation in the difference between the reception timing signal acquired by the reception timing acquisition unit 402 and the playback timing signal included in the program data received by the receiver 208 and decoded by the decoding unit 202. To achieve this end, the analysis unit 404 includes an internal clock 408, a rectangular area acquisition unit 410, and an area variation analysis unit 412.

The internal clock 408 generates TC, which is the time defined by the clock signal generated by the clock signal generation unit 268. The rectangular area acquisition unit 410 plots a base timing signal and a difference TC-TA between TC and TA in a coordinate system defined by the first axis and the second axis, the time TA indicated by ATS being measured along the first axis, and the difference being measured along the second axis, as shown in FIGS. 3A-3C and FIGS. 4A-4C. The rectangular area acquisition unit 410 acquires the area of the rectangular area bounded by the difference between adjacent values of TA on one side and by the difference between TC and TA on the adjacent side.

Figure 6A:
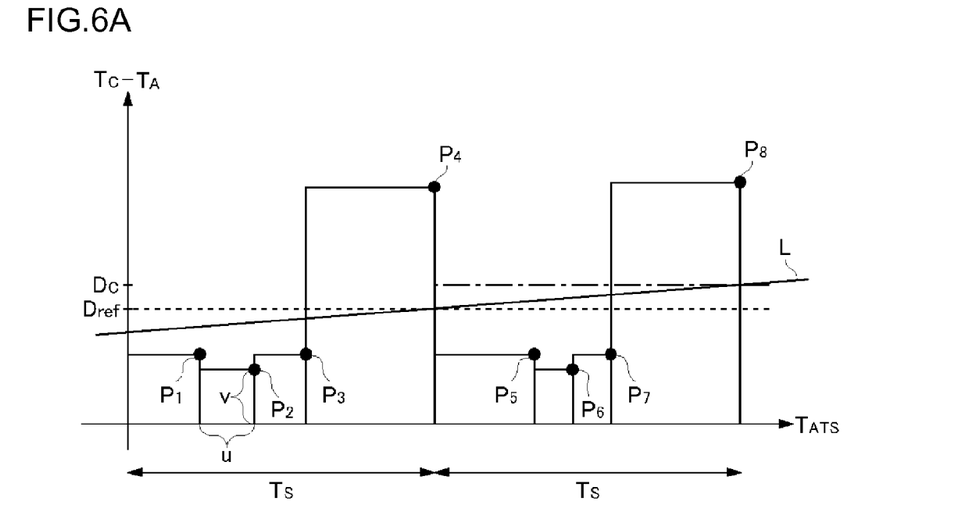
FIGS. 6A and 6B are graphs illustrating the principle of calculating the amount of synchronization signal adjustment introduced by the synchronization signal adjustment unit according to the embodiment.
Figure 6B:
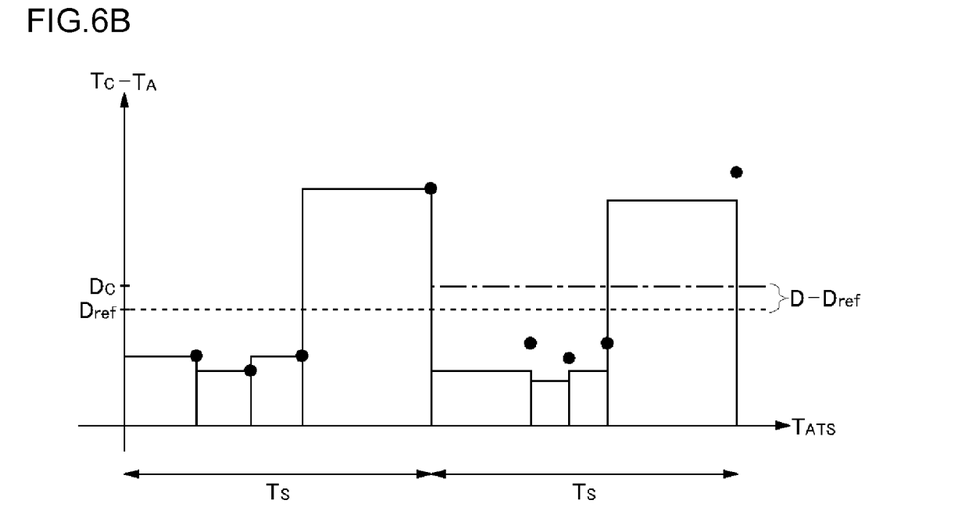

FIGS. 6A and 6B are graphs illustrating the principle of calculating the amount of synchronization signal adjustment introduced by the synchronization signal adjustment unit 400 according to the embodiment, and FIG. 6A shows a rectangular area for which the area is calculated by the rectangular area acquisition unit 410 according to the embodiment.

Referring to FIG. 6A, the straight line L indicates time-dependent variation in the difference in the absence of jitter. P1 through P8 denote TC-TA plotted against TA. For example, the rectangular area acquisition unit 410 acquires the area uv of the rectangle having, on one side, a length equal to the difference u in TA between the adjacent plots P1 and P2 and having, on the adjacent side, a length equal to the Y coordinate of the plot P2, i.e. the value v of TC-TA. The rectangular area acquisition unit 410 configures the initial value of the coordinate of the plot in the TA axis to be 0.

Referring back to FIG. 5, the area variation analysis unit 412 analyzes the trend of variation in the area acquired by the rectangular area acquisition unit 410 and so as to acquire the trend of time-dependent variation in the difference from the playback timing signal included in the program data received by the receiver 208 and decoded by the decoding unit 222. To achieve this end, the area variation analysis unit 412 includes a timer 414, a dc component acquisition unit 416, and a reference dc component storage unit 418.

The dc component acquisition unit 416 periodically acquires the average value of the area acquired by the rectangular area acquisition unit 410 at a predetermined interval between base timing signals. The term "a predetermined interval between base timing signals" means a time interval referred to for periodical analysis of the trend of time-dependent variation in the gap between the clock signals. Generally, the transmission channel 3 between the server 100 and the client device 200 is a complicated system so that the magnitude of jitter introduced in TC is subject to complicated variation. However, certain periodicity may be identified in jitter variation when it is observed over a sufficiently long time span. Thus, the predetermined interval TS of between base timing signals may be defined experimentally by allowing for the property of the server 100, the client device 200, the buffer, and the transmission channel 3. Preferably, the interval TS is set to equal to the period of variation in the jitter or longer.

The reference dc component storage unit 418 stores the average value of the area acquired by the rectangular area acquisition unit 410. The dc component acquisition unit 416 continues to acquire the average value of the area acquired by the rectangular area at the intervals TS of the base timing signals even after storing the average value in the reference dc component storage unit 418. However, once the average value is stored in the reference dc component storage unit 418, the value is not updated and the reference dc component storage unit 418 maintains the value. Instead, the dc component acquisition unit 416 outputs the acquired average value to the adjustment amount generation unit 406.

The adjustment amount generation unit 406 defines the difference between the average value of the area acquired by the dc component acquisition unit 416 at each interval TS of the base timing signals and the average value of the area stored in the reference dc component storage unit 418 as the amount of adjustment of the clock signal generated by the clock signal generation unit 268. In this sense, the average value acquired by the dc component acquisition unit 416 for the first time is a reference dc component Dref referred to when analyzing the trend of time-dependent variation in the gap between the clock signals. In this way, the adjustment amount generation unit 406 generates the amount of adjustment of the clock signal generated by the clock signal generation unit 268 by referring to the trend of time-dependent variation analyzed by the analysis unit 404 so that the difference between the reception timing signal and the playback timing signal remains constant.

FIG. 6B illustrates the adjustment amount calculated by the adjustment amount generation unit 406 according to the embodiment by determining the area. Referring to FIG. 6B, the broken line indicates the reference dc component Dref acquired by the dc component acquisition unit 416. The chain line indicates the average value D that the dc component acquisition unit 416 obtains after calculating the reference dc component Dref, i.e. the line indicates the dc component DC of the current rectangular area.

FIG. 6B shows a case where D>Dref and indicates that TC−TA is on the increase. Accordingly, the adjustment amount generation unit 406 defines the value D-Dref as the adjustment amount F of the difference TC−TA between the clock signals TC and TA. This causes the average value D acquired by the dc component acquisition unit 416 to be equal to the reference dc component Dref so that the shift between the clock signals is corrected.

The synchronization unit 226 shown in FIG. 1 adjusts the playback timing signal isolated by the isolation unit 224 and the vertical synchronization signal generated by the clock signal generation unit 268 according to the adjustment amount generated by the adjustment amount generation unit 406 so as to synchronize the video signal and the sound signal.

Figure 7:
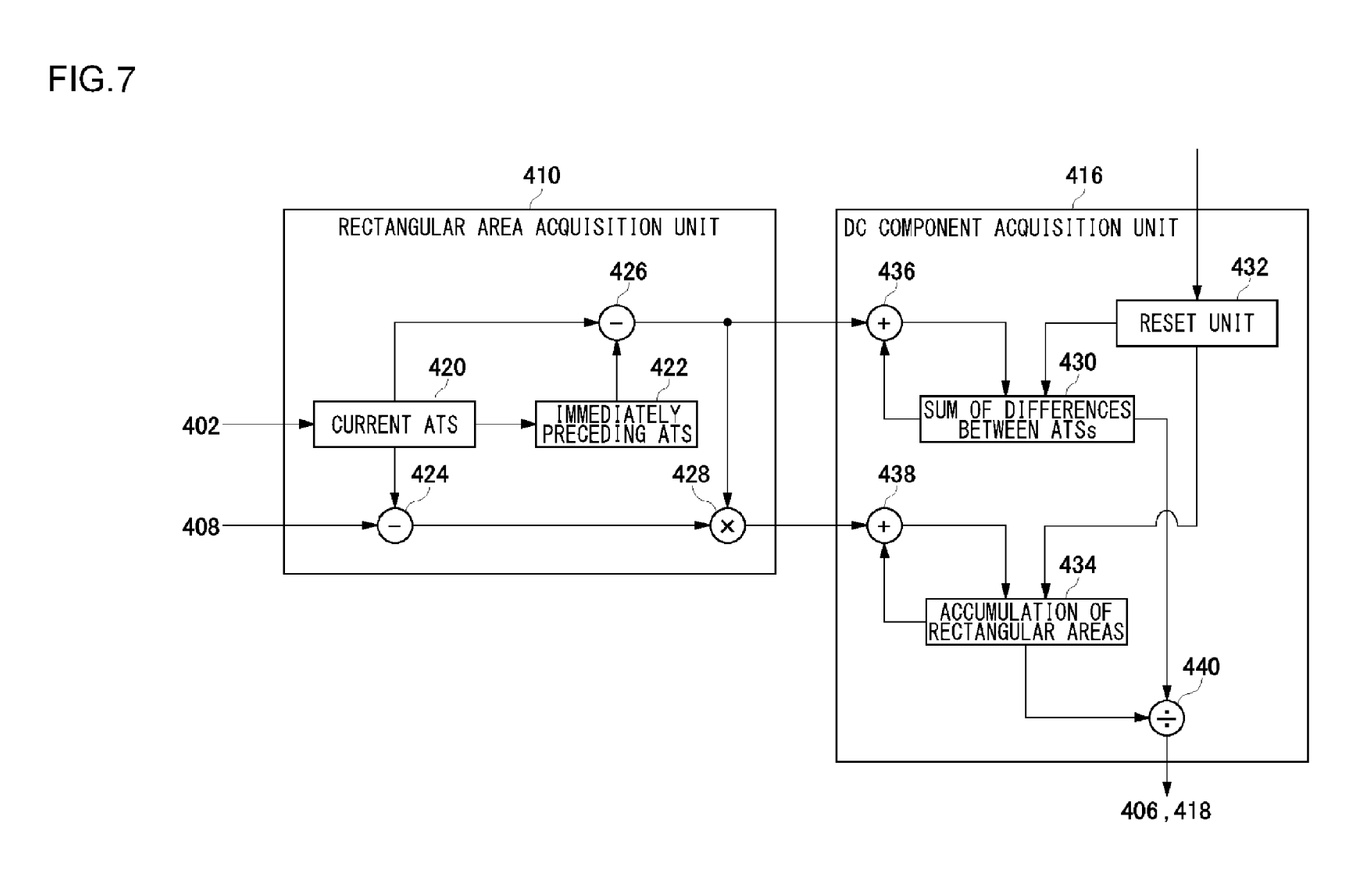
FIG. 7 schematically shows the internal structure of the rectangular area acquisition unit and the dc component acquisition unit according to the embodiment.

FIG. 7 schematically shows the internal structure of the rectangular area acquisition unit 410 and the dc component acquisition unit 416 according to the embodiment. The rectangular area acquisition unit 410 according to the embodiment includes a buffer 420 for storing the current ATS, a buffer 422 for storing the immediately preceding ATS, a first subtractor 424, a second subtractor 426, and a multiplier 428. The dc component acquisition unit 416 includes a buffer 430 for storing a sum ST of time differences between ATSs, a buffer 434 for storing an accumulation SS of the rectangular areas, and a reset unit 432 for initializing these buffers, a first adder 436, a second adder 438, and a divider 440.

The buffer 420 stores the latest reception timing signal TA acquired by the reception timing acquisition unit 402. The buffer 422 stores the reception timing signal TA stored in the buffer 420 as TA' before the buffer 420 acquires the next reception timing signal TA from the reception timing acquisition unit 402.

The first subtractor 424 subtracts the time TC generated by the internal clock 408 from TA stored in the buffer 422. The second subtractor 426 subtracts TA' stored in the buffer 422 from TA stored in the buffer 420. The multiplier 428 multiplies the output from the first subtractor 424 by the output from the second subtractor 426. This calculates the area of a single rectangular area shown in FIGS. 6A and 6B.

The first adder 436 adds the output from the second subtractor 426 and ST stored in the buffer 430. The buffer 430 stores the output from the first adder 436. The second adder 438 adds the output from the multiplier 428 and SS stored in the buffer 434. The buffer 434 stores the output from the second adder 438. The divider 440 divides SS stored in the buffer 434 by ST stored in the buffer 430 at the intervals TS of the base timing signals. The reset unit 432 initializes the values in the buffer 430 and the buffer 434 to 0 at the intervals TS of the base timing signals. This calculates the average value of the rectangular area at the intervals TS of the base timing signals.

Figure 8:
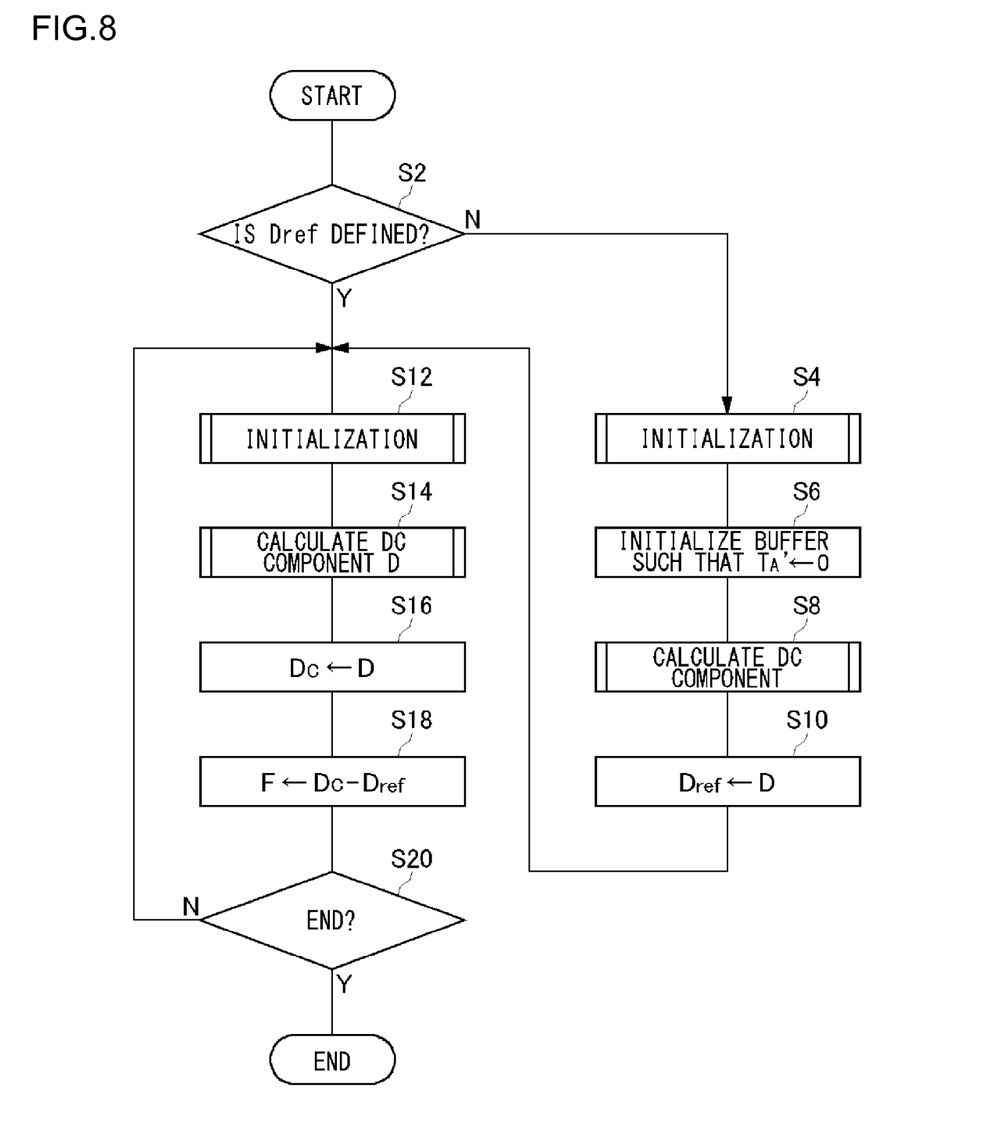
FIG. 8 is a flowchart showing the flow of the process of the synchronization signal adjustment unit according to the embodiment.

FIG. 8 is a flowchart showing the flow of the process of the synchronization signal adjustment unit 400 according to the embodiment. For example, the process of the flowchart is started when the client device 200 starts receiving program data from the server 100.

The dc component acquisition unit 416 determines whether the reference dc component Dref is defined in the reference dc component storage unit 418. If the reference dc component Dref is not stored (N in S2), the dc component acquisition unit 416 initializes the parameters (S4). The dc component acquisition unit 416 initializes the buffer 422 for storing TA' (immediately preceding ATS) to 0 (S6). Subsequently, the dc component acquisition unit 416 calculates the dc component D, the average value of the area acquired by the rectangular area acquisition unit 410 (S8). The dc component acquisition unit 416 stores the calculated dc component D as the reference dc component Dref in the reference dc component storage unit 418 (S10).

If the reference dc component Dref is already stored in the reference dc component storage unit 418 (Y in S2), or, once the dc component acquisition unit 416 stores the calculated dc component D as the reference dc component Dref in the reference dc component storage unit 418, the dc component acquisition unit 416 initializes the parameters (S12). Subsequently, the dc component acquisition unit 416 calculates the dc component DC, the average value of the area acquired by the rectangular area acquisition unit 410 (S14), and defines the calculated dc component D as the dc component DC of the current rectangular area (S16).

The adjustment amount generation unit 406 defines the value obtained by subtracting the reference dc component Dref from the dc component DC of the current rectangular area as the adjustment amount F to correct the shift between the clock signals (S18). While the user of the client device 200 continues to view the program (N in S20), the synchronization signal adjustment unit 400 repeats the aforementioned steps between S12 and S18 and continues to calculate the adjustment amount F to correct the shift between the clock signals. When the user of the client device 200 stops viewing the program (Y in S20), the process of the flowchart is terminated.

Figure 9:
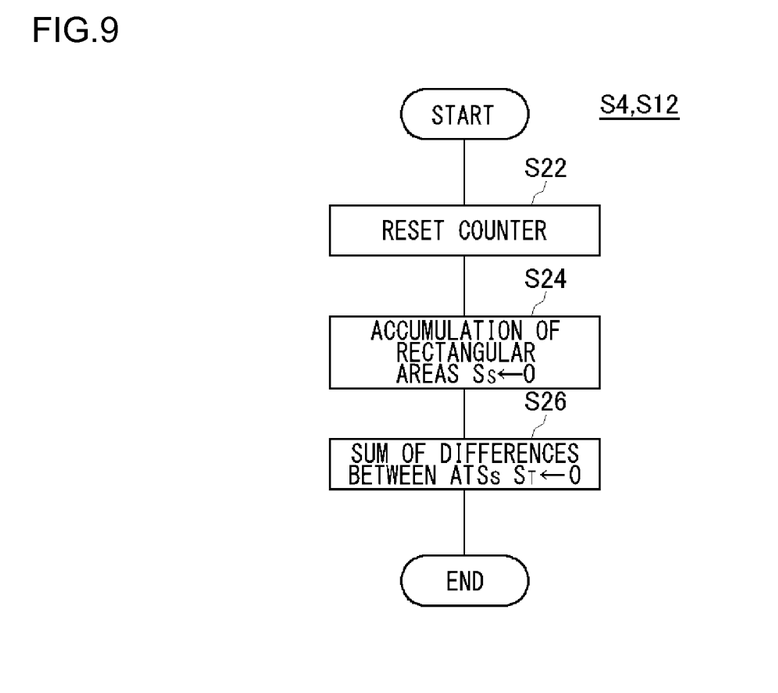
FIG. 9 is a flowchart showing the flow of the initialization process of the synchronization signal adjustment unit according to the embodiment.

FIG. 9 is a flowchart showing the flow of the initialization process of the synchronization signal adjustment unit 400 according to the embodiment and shows the steps S4 and S12 of FIG. 8 in further detail.

The reset unit 432 resets the value of the counter (not shown) for measuring the interval TS of the base timing signals to 0 (S22). The reset unit 432 resets the value in the buffer 430 to 0 (S24) and also sets the value of the buffer 434 to 0 (S26).

Figure 10:
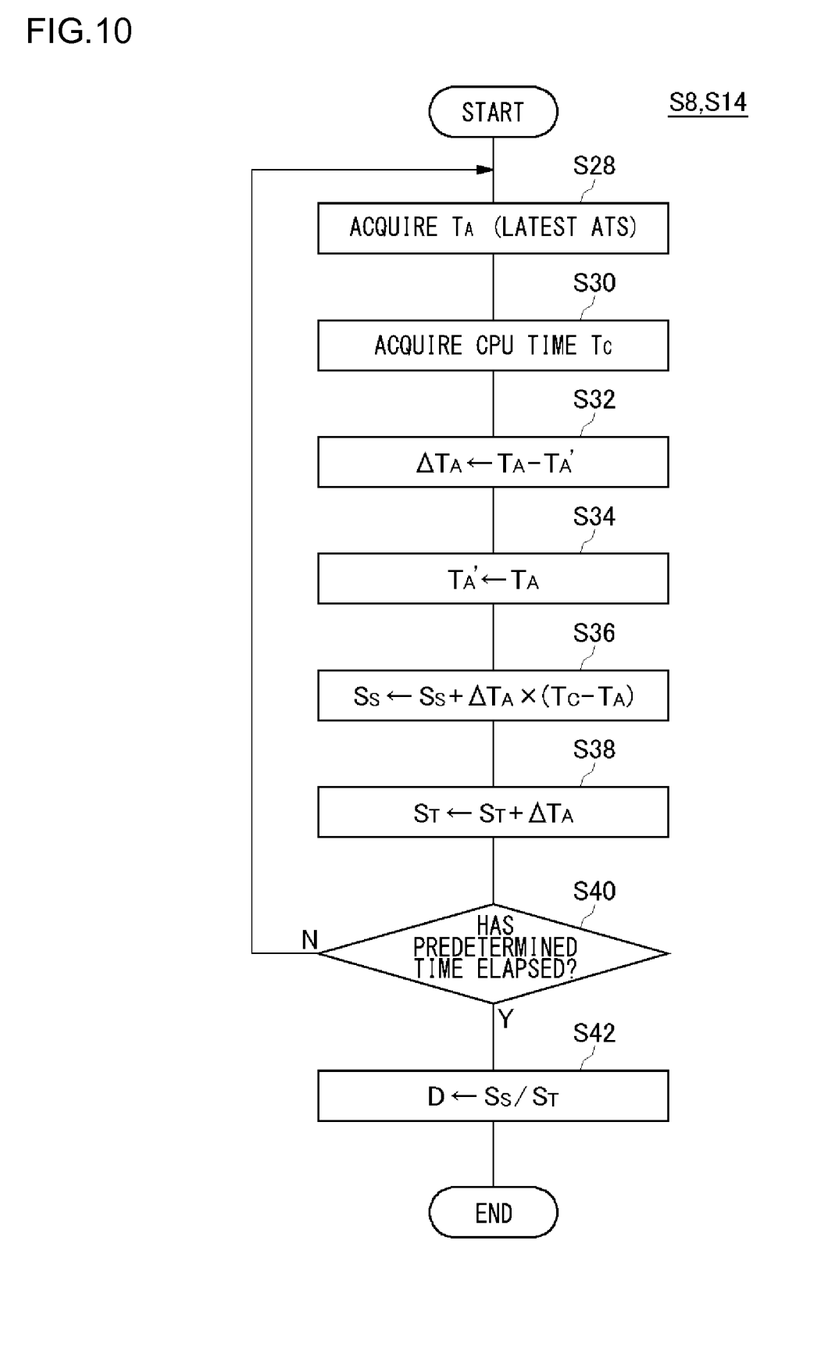
FIG. 10 is flowcharts showing the flow of the dc component calculation process of the synchronization signal adjustment unit according to the embodiment.

FIG. 10 is a flowchart showing the flow of the dc component calculation process of the synchronization signal adjustment unit 400 according to the embodiment and shows the steps S8 and S14 of FIG. 8 in further detail.

The buffer 420 acquires and stores the latest TA from the reception timing acquisition unit 402 (S28). The first subtractor 424 acquires the time TC defined by the clock signal and stores TC in a work buffer (not shown) (S30).

The second subtractor 426 outputs ATA obtained by subtracting the value of TA' (immediately preceding ATS) from the value of TA stored in the buffer 420 (S32). Subsequently, the buffer 422 replaces the value of TA' by the value of TA stored in the buffer 420 (S34).

The multiplier 428 multiplies the output from the first subtractor 424 by the output of the second subtractor 426. The second adder 438 adds the output of the multiplier 428 and SS stored in the buffer 434 and stores the sum in the buffer 434 (S36). The first adder 436 adds the output from the second subtractor 426 and ST stored in the buffer 430 and stores the sum in the buffer 430 (S38).

The aforementioned steps S28 through S38 are repeated until a time equal to or longer than the interval TS of the base timing signals elapses (N in S40). When a time equal to or longer than the interval TS of the base timing signals elapses (Y in S40), the process of the flowchart is terminated.

As described above, the data delivery system 300 of the embodiment provides a technology for improving synchronized playback of data delivered in a stream.

Described above is an explanation based on an exemplary embodiment. The embodiment is intended to be illustrative only and it will be obvious to those skilled in the art that various modifications to constituting elements and processes could be developed and that such modifications are also within the scope of the present invention.

(First Variation)

The rectangular area acquisition unit 410 is described above as plotting the base timing signal and the difference in a coordinate system in which the time TA indicated by ATS is measured along the horizontal axis, and the difference TC−TA between TC and TA is measured along the vertical axis, and as acquiring the area of the rectangular area bounded by the difference between adjacent values of TA on one side and by the difference between TC and TA on the adjacent side. In the sense that the gap of TC from TA is determined, TA is defined as a base timing signal and TC is defined as a reference timing signal.

The requirement for the rectangular area acquisition unit 410 is to calculate a value to learn the trend of time-dependent variation in the difference between TC and TA. For example, TC may be defined as a base timing signal and TA as a reference timing signal. The rectangular area acquisition unit 410 is described above as using a value obtained by subtracting TA' (immediately preceding ATS) from TA (current ATS) to acquire the area of a rectangular area. Alternatively, the rectangular area acquisition unit 410 may use a value obtained by subtracting the value of current ATS from the value of ATS in the immediate future.

(Second Variation)

The rectangular area acquisition unit 410 is described above as calculating the reference dc component, which serves as a reference to analyze the trend of time-dependent variation in the gap between the clock signals. The rectangular area acquisition unit 410 may acquire the reference dc component Dref and store it in the reference dc component storage unit 418 after a period of predetermined period of period of time for stabilization elapses since the synchronization signal adjustment unit 400 including the area variation analysis unit 412 is started. The term "a predetermined period of time for stabilization" denotes a period of time required for stabilization of the system including the server 100, the client device 200, and the transmission channel 3 connecting the server 100 and the client device 200. The period of time for stabilization may be experimentally defined by allowing for the property of the server 100, the client device 200, the buffer, the transmission channel, etc. For example, the period of time for stabilization may be several times as long as the interval TS of the aforementioned base timing signals.

Generally, a large jitter is introduced immediately after the system is started. The reference dc component calculated in this period contains large noise so that the precision may be poor. Therefore, the amount of adjustment of the gap between the clocks signals would be more accurately calculated by calculating the reference dc component Dref when a predetermined period of time for stabilization elapses.

(Third Variation)

The clock signal generation unit 268 is described above as functioning as the vertical synchronization signal generation unit for generating a vertical synchronization signal used to output images. This is based on the assumption that the period of the clock generated by the clock signal generation unit 268 is fixed. Instead, the clock signal generation unit 268 may generate a vertical synchronization signal by referring to the output from an oscillator that generates clocks of a variable period.

Figure 11:
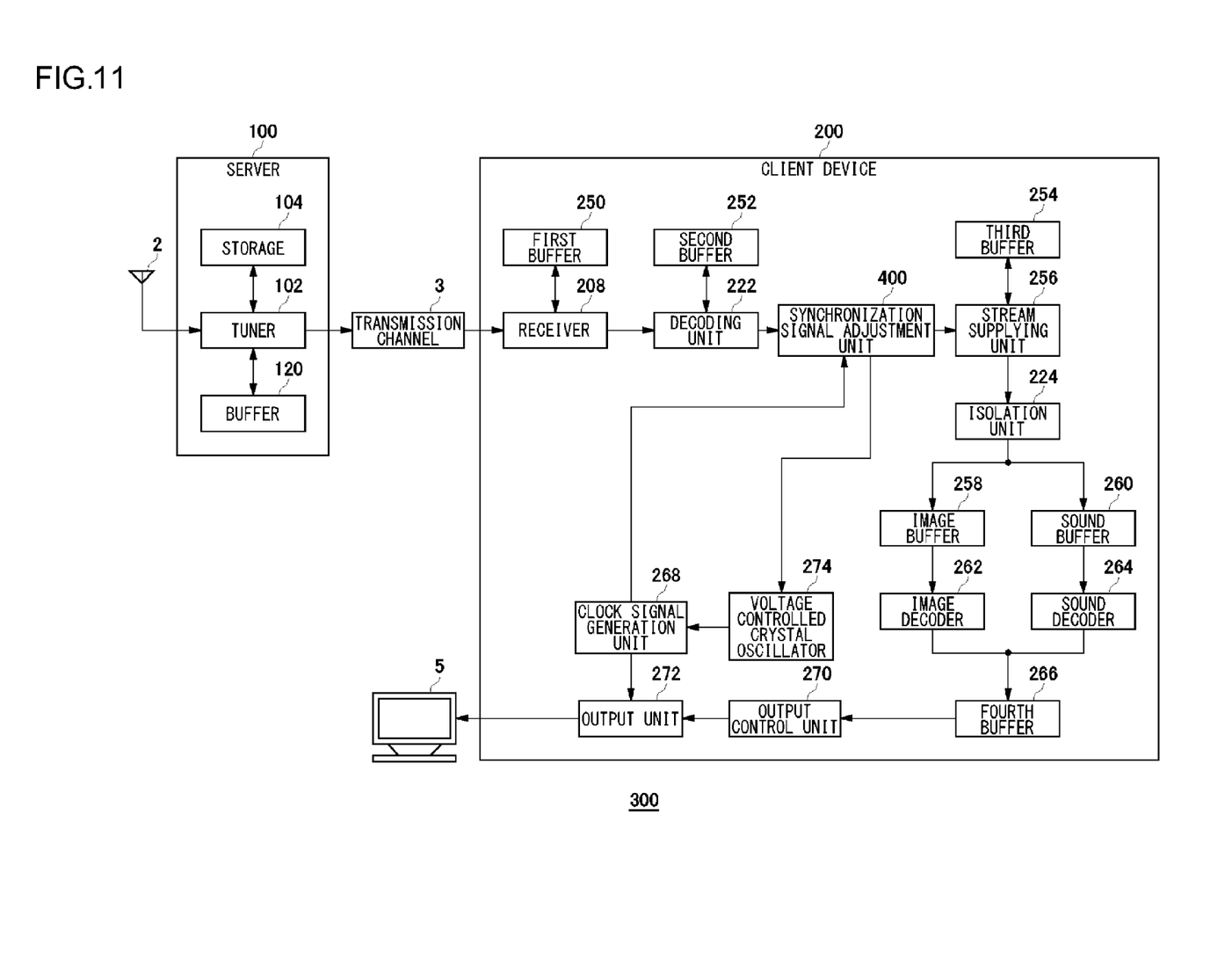
FIG. 11 schematically shows the overall structure of the data delivery system according to a variation of the embodiment.

FIG. 11 schematically shows the overall structure of the data delivery system 300 according to a variation of the embodiment. Hereinafter, the description that also applies to the data delivery system 300 shown in FIG. 1 is omitted or simplified.

The client device 200 according to the variation includes a voltage-controlled crystal oscillator 274. The frequency of the clock generated by the voltage-controlled crystal oscillator 274 varies in accordance with the applied voltage so that the frequency of the clock signal generated can be changed. The voltage-controlled crystal oscillator 274 acquires the amount of adjustment of the gap between the clock signals from the synchronization signal adjustment unit 400 so as to correct an error between the timing signals generated by the oscillator in the broadcast station and by the clock signal generation unit 268 in the client device 200.

The clock signal generation unit 268 generates the vertical synchronization signal by referring to the output from the voltage-controlled crystal oscillator 274. According to the client device 200 of the variation of the embodiment, it is possible to match the number of clocks of the timing signals generated by the oscillator in the broadcast station and by the clock signal generation unit 268 in the client device 200.

The output unit 272 may output the image and sound to the display unit 5 in accordance with the timing signal generated by the clock signal generation unit 268. This is because the reliability of timing generated by the clock signal generation unit 268 is improved as the timing signal generated by the oscillator in the broadcast station and the timing signal generated by the clock signal generation unit 268 in the client device 200 are synchronized in terms of the number of clocks.

What is claimed is:

1. A synchronization signal adjustment device comprising:
a receiver configured to receive program data that includes an image signal including a plurality of frames; a sound signal; and a playback timing signal used for synchronized playback of the image signal and the sound signal, wherein each signal is delivered in a stream via a network;
a clock signal generation unit configured to generate a clock signal that is independent of the playback timing signal included in the program data received by the receiver;
a reception timing signal acquisition unit configured to acquire a reception timing signal indicating a receiving time of the program data by the receiver, by referring to the clock signal generated by the clock signal generation unit;
an analysis unit configured to analyze a trend of time-dependent variation in a detected difference between the reception timing signal acquired by the reception timing acquisition unit and the playback timing signal included in the program data received by the receiver; and
an adjustment amount generation unit configured to generate an adjustment amount of the clock signal, which is generated by the clock signal generation unit and which causes the difference between the reception timing signal and the playback timing to be constant, by referring to the trend of time-dependent variation analyzed by the analysis unit.

2. The synchronization signal adjustment device according to claim 1,
wherein the analysis unit includes:
a rectangular area acquisition unit configured to acquire, given that one of the playback timing signal and the reception timing signal is defined as a base timing signal and the other as a reference timing signal, and that the base timing signal and the difference between the reference timing signal and the base timing signal are plotted in a coordinate system in which the base timing signal is measured along a first axis and the difference is measured along a second axis, an area of a rectangular area bounded by a detected difference between adjacent values of base timing signals on one side and by a detected difference between the reference timing signal and the base timing signal on the adjacent side; and
an area variation analysis unit configured to analyze a trend of variation in the area acquired by the rectangular area acquisition unit so as to acquire the trend of time-dependent variation in the difference from the playback timing signal included in the program data received by the receiver.

3. The synchronization signal adjustment device according to claim 1,
wherein the area variation analysis unit includes:
a dc component acquisition unit configured to acquire an average value of areas in a predetermined interval between the base timing signals; and
a reference dc component storage unit configured to store the average value of areas acquired by the rectangular area acquisition unit,
wherein the dc component acquisition unit continues to acquire the average value of areas acquired by the rectangular area acquisition unit at the predetermined interval between the base timing signals, even after the average value is stored in the reference dc component storage unit, and
wherein the adjustment amount generation unit defines a difference between the average value of areas acquired by the dc component acquisition unit at the predetermined interval between the base timing signals and the average value of areas stored in the reference dc component storage unit, as the adjustment amount of the clock signal generated by the clock signal generation unit.

4. The synchronization signal adjustment device according to claim 3,
wherein the rectangular area acquisition unit acquires the average value of areas and stores the average value in the reference dc component storage unit after a predetermined period of time has elapsed for stabilization since the start of area variation analysis unit, and
wherein the reference dc component maintains the average value of areas once stored while the area variation analysis unit remains activated.

5. A synchronization signal adjustment method implemented by a processor, comprising:
receiving program data that includes: an image signal including a plurality of frames; a sound signal; and a playback timing signal used for synchronized playback of the image signal and the sound signal, wherein each signal is delivered in a stream via a network;
generating a clock signal that is independent of the playback timing signal included in the received program data;
acquiring a reception timing signal indicating a receiving time of the program data by referring to the generated clock signal;
analyzing a trend of time-dependent variation in a detected difference between the acquired reception timing signal and the playback timing signal included in the received program data; and
generating an adjustment amount of the clock signal unit, which causes the difference between the reception timing signal and the playback timing to be constant, by referring to the trend of variation.

6. A non-transitory computer-readable recording medium encoded with a program comprising:

a receiver module configured to receive program data that includes: an image signal including a plurality of frames; a sound signal; and a playback timing signal used for synchronized playback of the image signal and the sound signal, wherein each signal is delivered in a stream via a network;

a generation module configured to generate a clock signal that is independent of the playback timing signal included in the received program data;

an acquisition module configured to acquire a reception timing signal indicating a receiving time of the program data by referring to the generated clock signal;

an analysis module configured to analyze a trend of time-dependent variation in a detected difference between the acquired reception timing signal and the playback timing signal included in the received program data; and a generation module configured to generate an adjustment amount of the clock signal unit, which causes the difference between the reception timing signal and the playback timing to be constant, by referring to the trend of variation.

7. An image display device comprising:

the synchronization signal adjustment device according to claim 1;

an isolation unit configured to isolate the image signal, the sound signal, and the playback timing signal from the program data received by the synchronization signal adjustment device;

a vertical synchronization signal generation unit configured to generate a vertical synchronization signal used to output an image;

a synchronization unit configured to synchronize the image signal and the sound signal isolated by the isolation unit, by referring to the playback timing signal isolated by the isolation unit, the vertical synchronization signal generated by the vertical synchronization signal generation unit, and the adjustment amount generated by the synchronization signal adjustment device; and an output unit configured to play back the image signal and the sound signal synchronized by the synchronization unit, by referring to the vertical synchronization signal generated by the vertical synchronization signal generation unit.

8. A synchronization signal generation device comprising:

the synchronization signal adjustment device according to claim 1;

a voltage-controlled crystal oscillator configured to generate a clock signal of a variable frequency; and a vertical synchronization signal generation unit configured to generate a vertical synchronization signal used to output an image, by referring to a clock signal generated by the voltage-controlled crystal oscillator, wherein the voltage-controlled crystal oscillator adjusts the frequency of the generated clock signal, by referring to the adjustment amount of the clock signal generated by the synchronization signal adjustment device.

* * * * *